(12) United States Patent
Abel et al.

(10) Patent No.: US 7,481,609 B2
(45) Date of Patent: Jan. 27, 2009

(54) SUPPORT STRUCTURE APPARATUS AND METHOD

(75) Inventors: William D. Abel, Byron, IL (US); Alan J. Mackey, Dixon, IL (US); John G. Nanna, Lake Geneva, WI (US); Thomas A. Holmes, DeKalb, IL (US); Douglas E. Colclasure, Aurora, IL (US)

(73) Assignee: The Cretex Companies, Inc., Elk River, MN (US)

( * ) Notice: Subject to any disclaimer, the term of this patent is extended or adjusted under 35 U.S.C. 154(b) by 0 days.

(21) Appl. No.: 11/563,926

(22) Filed: Nov. 28, 2006

(65) Prior Publication Data

US 2007/0140804 A1    Jun. 21, 2007

Related U.S. Application Data

(62) Division of application No. 10/950,108, filed on Sep. 24, 2004, now Pat. No. 7,144,211.

(51) Int. Cl.
*B61D 45/00* (2006.01)
(52) U.S. Cl. ...................................... 410/101
(58) Field of Classification Search .................. 410/44, 410/77, 80, 121, 101; 414/462; 224/282, 224/545, 548, 553
See application file for complete search history.

(56) References Cited

U.S. PATENT DOCUMENTS 3,655,218 A * 4/1972 Taylor ......................... 410/44
5,134,828 A   8/1992 Baur
5,245,806 A   9/1993 Baur et al.

(Continued)

FOREIGN PATENT DOCUMENTS

SU   1111913   9/1984
SU   1207850   1/1986

OTHER PUBLICATIONS

J.W. Peters, Inc., illustration of shipping frame apparatus, publicly available prior to 1994, Dec. 31, 1993.

*Primary Examiner*—H Gutman
(74) *Attorney, Agent, or Firm*—Michael Best & Friedrich LLP (57) ABSTRACT

A method of reducing the effective width of cargo, such as a concrete double-tee. The method comprises positioning the arm in a first position in which the arm is substantially horizontal, the arm being pivotally biased toward the first position, lowering the double-tee onto the arm such that the first leg of the double-tee is received by the first bracket and the second leg of the double-tee is received by the second bracket, and pivoting the arm and double-tee to a second position in which the second end of the arm contacts the base to support the arm, the arm being biased toward the second position when the arm supports the double-tee. The concrete double-tee includes a deck, a first leg and a second leg. The support structure includes a base, a stanchion extending upwardly from the base, an arm pivotally connected to the stanchion and extending between a first and second end. The arm includes a first bracket disposed near the first end and a second bracket disposed near the second end.

19 Claims, 5 Drawing Sheets

U.S. PATENT DOCUMENTS

| | | |
|---|---|---|
| 5,386,675 A | 2/1995 | Baur et al. |
| 5,683,213 A | 11/1997 | Baur et al. |
| 5,909,989 A | 6/1999 | Baur et al. |
| 5,947,665 A | 9/1999 | Baur et al. |
| 6,848,880 B2 * | 2/2005 | Erech et al. .................. 414/462 |
| 6,896,457 B2 * | 5/2005 | Halliar ........................ 410/77 |
| 7,144,211 B2 * | 12/2006 | Abel et al. .................... 410/77 |
| 7,204,665 B2 * | 4/2007 | Heuvel et al. ................. 410/44 |
| 2003/0210965 A1 * | 11/2003 | Erech et al. .................... 410/2 |
| 2007/0166119 A1 * | 7/2007 | Heuvel et al. ................. 410/44 |
| 2007/0170217 A1 * | 7/2007 | Lemoine ..................... 224/405 |
| 2007/0177955 A1 * | 8/2007 | Heuvel et al. ................. 410/44 |
| 2007/0224009 A1 * | 9/2007 | Wehrli et al. .................. 410/44 |

\* cited by examiner

SUPPORT STRUCTURE APPARATUS AND METHOD

RELATED APPLICATIONS

This patent application is a divisional of and claims priority to U.S. patent application Ser. No. 10/950,108 filed Sep. 24, 2004.

FIELD OF THE INVENTION

This invention relates to an apparatus and method for supporting an oversized object.

BACKGROUND OF THE INVENTION

Many states or jurisdictions have laws that regulate the transportation of oversized or wide loads over public roadways. These laws generally provide a limit on the effective width of the load with respect to the surface of the road. Loads having an effective width greater than a certain distance may be subject to restrictions limiting when, where, or how the load may be transported. Oversized loads or cargo may also be subject to height restrictions during transportation. The actual limits may vary depending on jurisdiction. These restrictions may complicate the process of transporting an oversized load and result in a cost of additional time and money to satisfy the restrictions.

Prefabricated building sections, such as preformed concrete sections, are an example of an oversized load that is often transported. Pre-formed concrete sections are used in the construction industry to simplify and economize the building process. These pre-formed sections are often formed at a remote location away from a building site, and then transported to the building site to be assembled as part of the structure. One example of a pre-formed section is a concrete section commonly referred to as a "double-tee." A double-tee generally includes a flat deck and two support beam legs extending below the deck and along the length of the deck. The section is called a double-tee because the cross-sectional view of the section resembles two T's connected side-by-side. A double-tee may be used to construct structures such as parking ramps, bridges, floors, or other structures that may require a relatively strong and durable surface and a large amount of usable surface area. The width of many double-tees is often greater than the limits imposed by various jurisdictions for oversized or wide loads. Therefore, double-tees are often subject to various restrictions regarding the transportation of the loads.

SUMMARY OF THE INVENTION

The present invention provides a support structure for supporting and tilting an oversized load or cargo to reduce the effective width of the load or cargo. Some of the restrictions imposed on transporting an oversized load may be avoided if the effective width of the load is below the specified limit. The support structure is most effective for a relatively flat cargo, such as a concrete double-tee section, or a cargo in which the height and width dimensions are not similar. The support structure reduces the effective width of the cargo by tilting the cargo so the exceeding width dimension is positioned diagonally.

In some aspects and in some constructions, the support structure comprises a base supported by the transport vehicle and a stanchion extending upwardly from the base. A rocker arm is pivotally coupled to the stanchion to pivot about a pivot axis. The arm includes a first and second end disposed opposite one another. The arm has a center of gravity disposed between the first end and the pivot axis that biases the arm to pivot in a first pivotal direction. A first bracket is positioned near the first end of the arm for receiving the first leg of the concrete section, and a second bracket is positioned near the second end for receiving the second leg of the concrete section. The concrete section has a concrete section center of gravity. The first and second brackets position the concrete section such that the concrete section center of gravity is disposed between the pivot axis and the second end and causes the arm to pivot in a second pivotal direction opposite the first pivotal direction.

In some aspects and in some constructions, the support structure comprises an adjustable sleeve adjustably connected to the first end of the arm. The adjustable sleeve is movable between a retracted position and an extended position. The first bracket is connected to the adjustable sleeve and the adjustable sleeve may be moved to position of the first bracket with respect to the second bracket. The arm may include a locking member releaseably engaging the arm and the adjustable sleeve to restrict movement of the adjustable sleeve with respect to the arm.

The arm is pivotal between a first position, in which the arm does not contact the base, and a second position, in which the second end of the arm contacts the base. The support structure also includes a pivot stop connected to the stanchion. The pivot stop restricts pivotal movement of the arm in a first pivotal direction and the arm contacts the pivot stop when the arm is in the first position. The base restricts pivotal movement of the arm in a second pivotal direction opposite the first pivotal direction.

In some aspects and in some constructions, the support structure may be mounted on a trailer for transporting the oversized load or cargo. The trailer may include a frame mounted near each end of the trailer. The cargo may be tilted or supported by the frames to reduce the effective width of the cargo relative to the ground or surface. With a reduced effective width, the cargo may be transported with fewer regulations or restrictions. The bolster frames may also be mounted to other transportation devices, such as rail cars, boats, or barges.

Independent features and independent advantages of the present invention will become apparent to those skilled in the art upon review of the following detailed description, claims and drawings.

Before any embodiments of the invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

Although references may be made below to directions, such as left, right, up, down, top, bottom, front, rear, back, etc., in describing the drawings, these references are made relative to the drawings (as normally viewed) for convenience. These directions are not intended to be taken literally or limit the present invention in any form.

DETAILED DESCRIPTION

Figure 1:
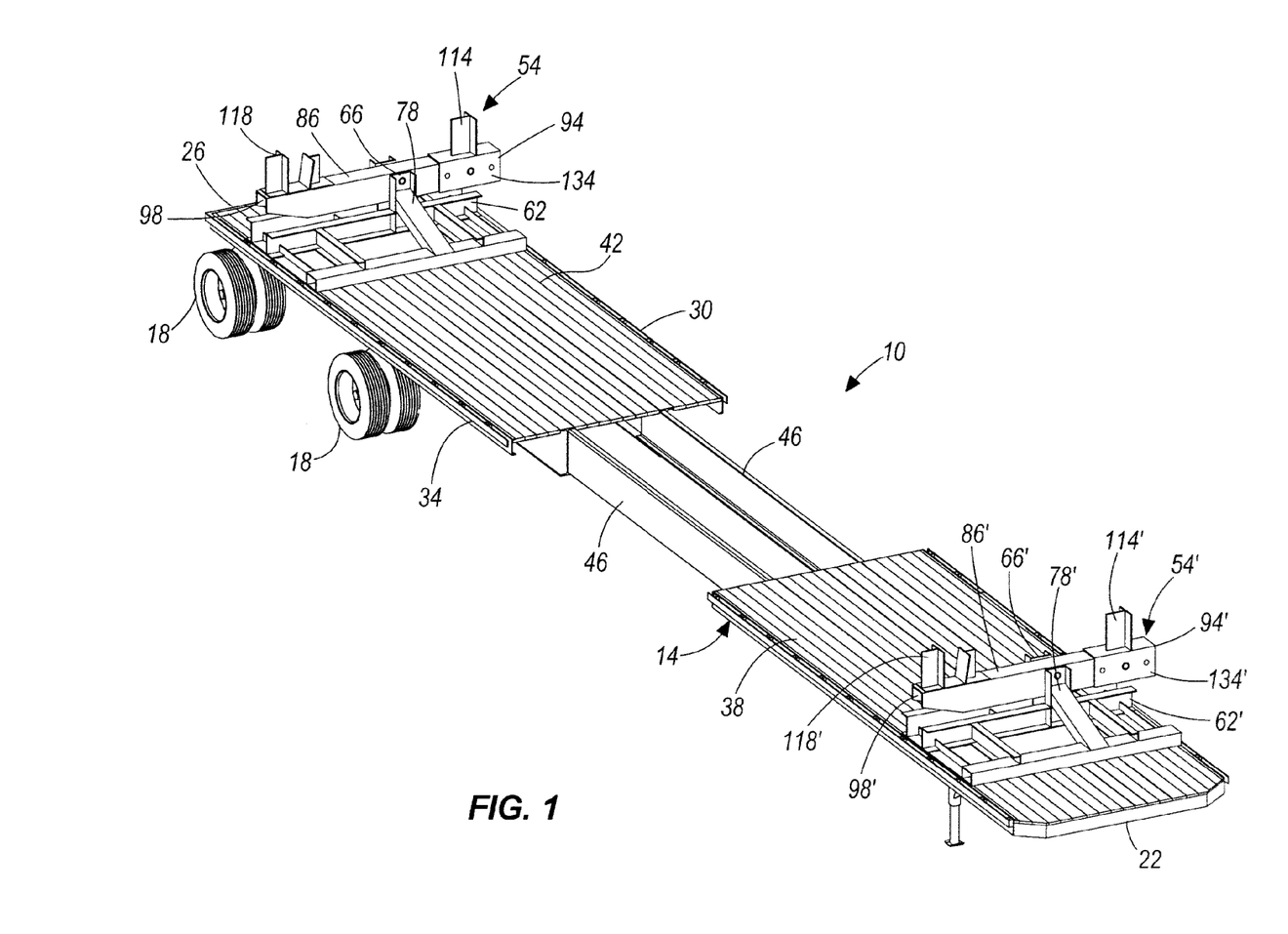
FIG. 1 is a perspective view of a trailer having a support frame embodying aspects of the present invention.
Figure 2:
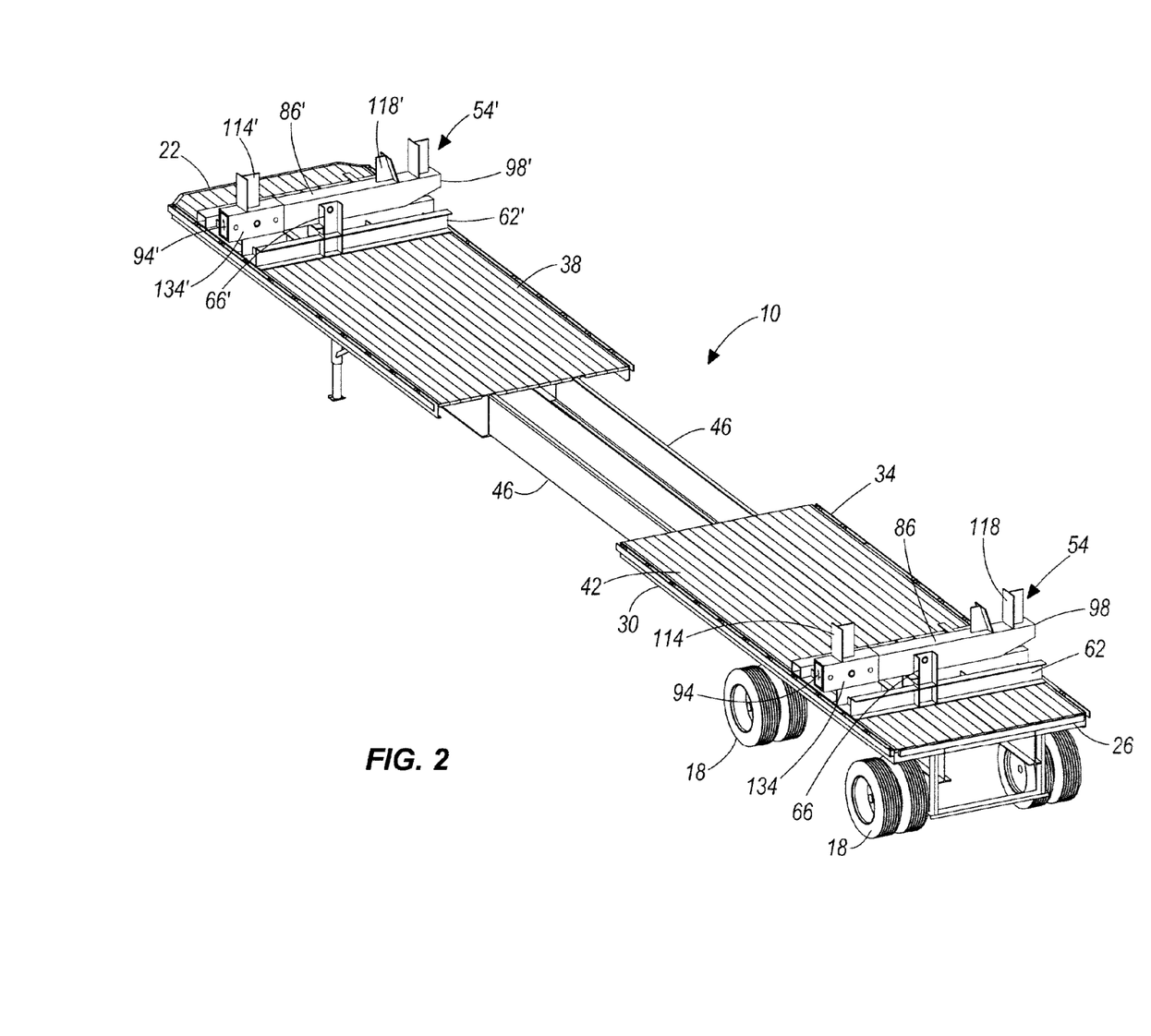
FIG. 2 is a perspective view of the trailer having the support frame of FIG. 1.
Figure 5:
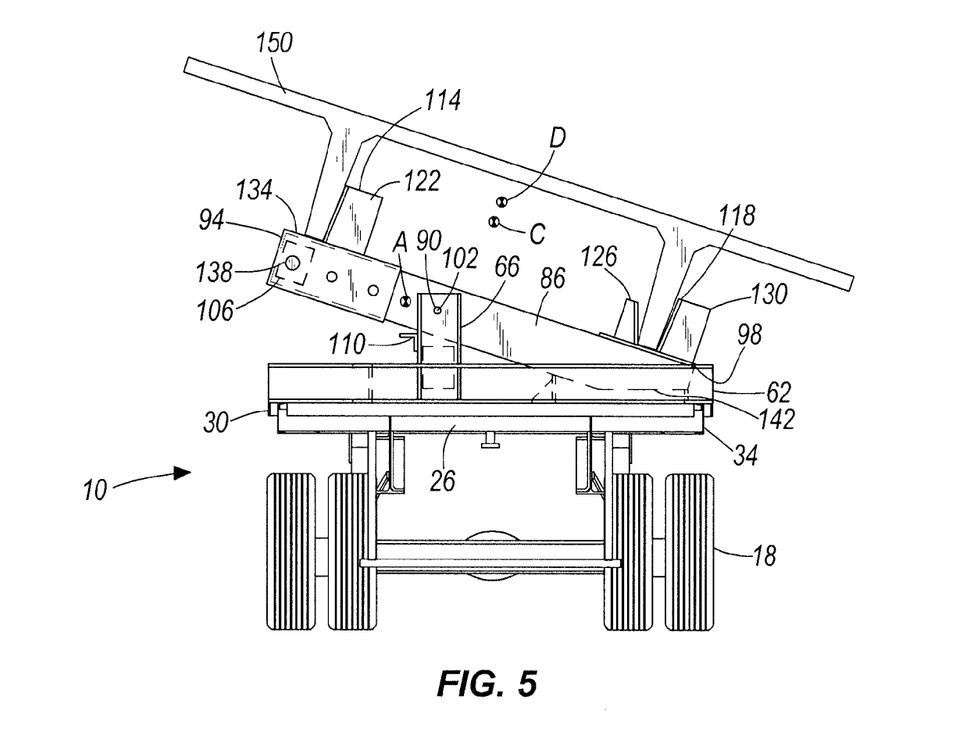
FIG. 5 is an end view of the trailer having the support frame of FIG. 1.

FIGS. 1-2 illustrate a truck trailer 10 for transporting an oversized object or cargo, such as a pre-formed concrete double-tee section (FIG. 5). The trailer 10 includes a trailer frame 14 and wheels 18 supporting the trailer frame 14, similar to a flatbed trailer, and is designed to be pulled by a semi tractor. In the illustrated construction, the trailer 10 includes a forward end 22 connectable to the tractor, and a rearward end 26 opposite the forward end 22. The trailer 10 extends in a longitudinal direction from the forward end 22 toward the rearward end 26 and has a length extending between the forward and rearward ends 22, 26. The trailer 10 also extends in a lateral direction from a first side 30 toward a second side 34 and has a width extending between the first and second sides 30, 34.

In the illustrated construction, the trailer frame 14 includes a platform having two separate platform portions, a forward portion 38 near the forward end 22 and a rearward portion 42 near the rearward end 26, with a gap between the portions 38, 42. Two beams 46 extend across the gap and connect the two portions 38, 42 to one another. The length of the beams 46 may be selected to lengthen the trailer 10 and may permit some flexibility for the trailer 10. In some aspects and in some constructions, the forward portion 38 and the rearward portion 42 may be combined to form a single platform. Additionally, in some aspects and in some constructions, the forward and rearward platform portions 38, 42 of the trailer 10 may not be necessary and the load may be supported on the trailer frame 14.

The trailer 10 includes a support structure for supporting the cargo on the trailer 10. In the illustrated construction, the support structure includes a first support frame 54 supported on the rearward portion 42 of the trailer frame 14 and a second support frame 54' supported on the forward portion 38 of the trailer frame 14. In some aspects and in some constructions, the support structure may include only a single frame, or may also include more than two frames. The first and second frames 54, 54' are similar in construction, and only the first frame 54 will be described in detail. Corresponding elements of the second frame 54' have the same reference number but are denoted with an "'".

The frame 54 includes a base 62 and a stanchion 66 extending upwardly from the base 62. The stanchion 66 is an upright post or support and includes a lower end connected to the base 62 and an upper end opposite the lower end. A stanchion brace 78 extends from the base 62 to the stanchion 66 and is rigidly connected to the base 62 and stanchion 66 to provide rigid support for the stanchion 66.

Figure 4:
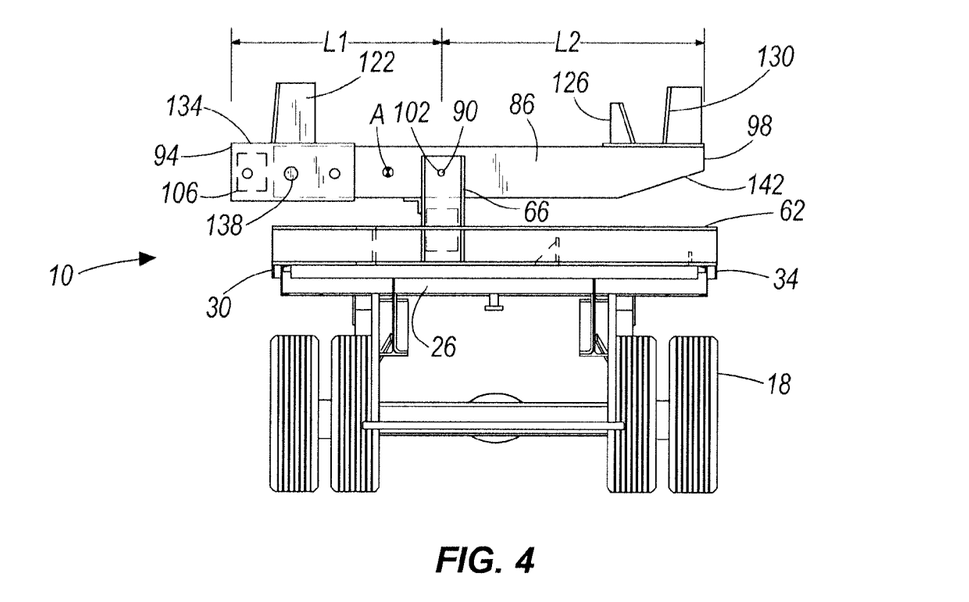
FIG. 4 is an end view of the trailer having the support frame of FIG. 1.
Figure 6:
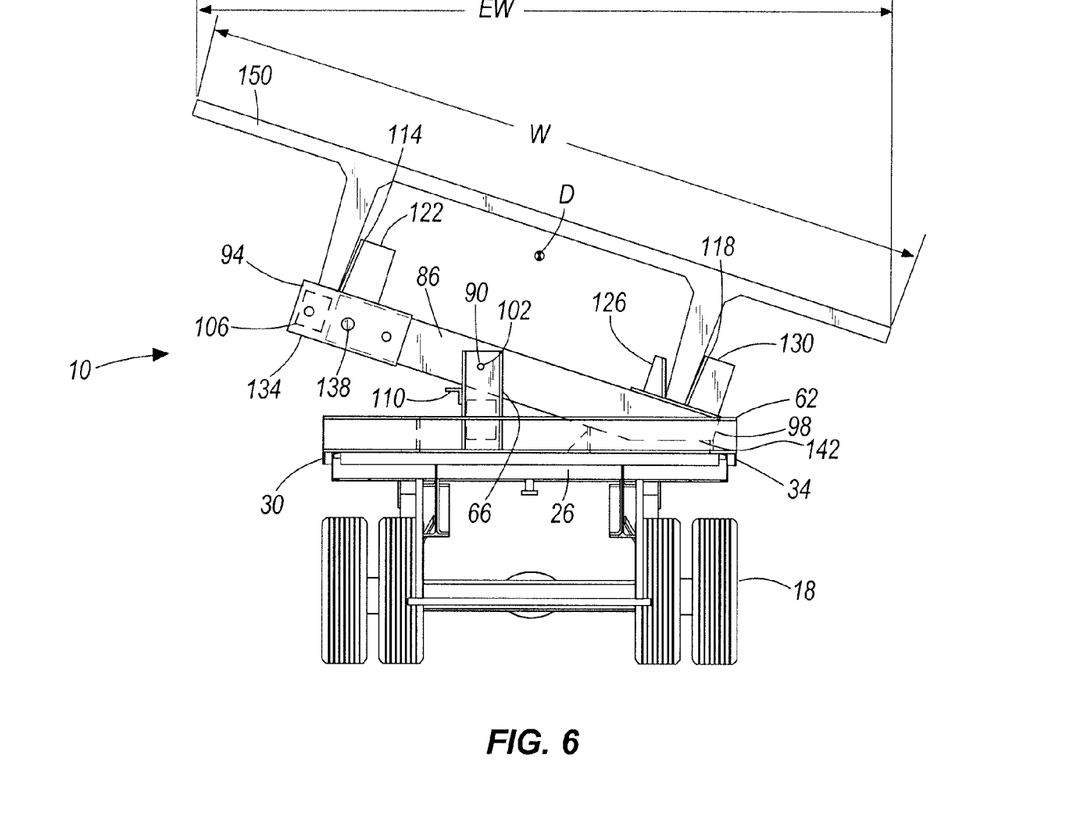
FIG. 6 is an end view of the trailer having the support frame of FIG. 1.

The frame 54 also includes a rocker arm 86 pivotally connected to the upper end 74 of the stanchion 66. The arm 86 is supported for pivotal movement relative to the stanchion 66 about a pivot axis 90 (FIG. 4) between an unloaded position, as shown in FIG. 4, and a loaded position, as shown in FIGS. 5 and 6. The arm 86 includes a generally elongated beam structure extending from a first end 94 to a second end 98. In the illustrated construction, the stanchion 66 includes two beams extending upwardly from the base 62. The arm 86 is supported between the two beams of the stanchion 66 with a pivot pin 102. The pivot pin 102 extends from one beam, through the arm, and to the other beam of the stanchion 66 and permits pivotal movement of the arm 86 with respect to the stanchion 66. The pivotal arm 86 facilitates loading a cargo onto the frame 54 and removing a cargo from the frame 54. The pivotal movement of the arm 86 permits the frame 54 to tilt the cargo and reduce the effective width of the cargo. A method for loading a cargo onto the frame 54 is described in greater detail below.

Figure 3:
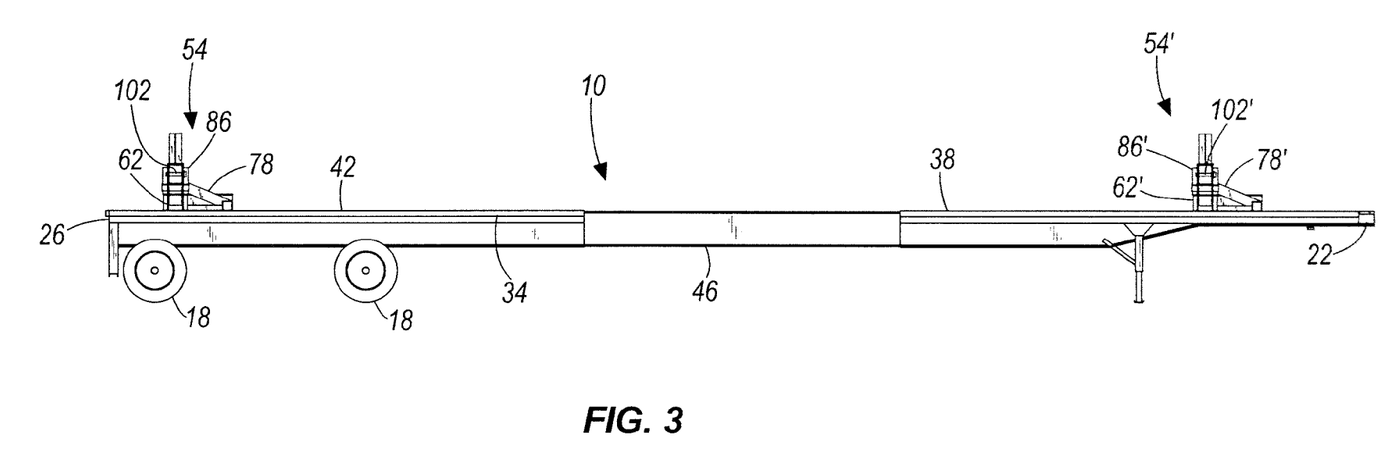
FIG. 3 is a side view of the trailer having the support frame of FIG. 1.

FIG. 3 illustrates an elevation view of the trailer 10 as shown from the side of the trailer 10 looking toward the second side 34 of the trailer 10. FIG. 3 shows the first frame 54 connected to the rearward portion 42 of the trailer frame 14 and the second frame 54' connected to the forward portion 38 of the trailer frame 14. Both frames 54, 54' extend upwardly about the same distance from the trailer frame 14.

FIGS. 4-6 illustrate a rear view of the trailer 10 from behind the trailer 10 looking toward the rearward end 26. FIG. 4 illustrates the frame 54 in an unloaded position, and FIGS. 5 and 6 illustrate the frame 54 in a loaded position supporting a cargo. FIGS. 5 and 6 illustrate the cargo as a concrete double-tee 150 having a relatively flat deck and a left leg and a right leg extending downwardly from the deck. The size and dimensions of the double-tee 150 may vary depending on the intended application of the double-tee 150. Double-tees commonly have a width of about 15 feet, however, the width may vary and double-tees having a width of about 12 feet, 16 feet, or even 18 feet are also known. As described below, the length of the arm 86 is adjustable to accommodate double-tees having various widths. The length of the legs from the deck may also vary on double-tees. Three common lengths for the legs of double-tees are about 34 inches, about 30 inches, and about 24 inches. The frame 54 may also accommodate double-tees having varying leg lengths.

FIG. 4 illustrates the frame 54 at rest in the unloaded position. The arm 86 is pivotally connected to the stanchion 66 with a pivot pin 102, and the arm 86 pivots about the pivot axis 90 extending through the pivot pin 102. The pivot pin 102 extends through the arm 86 near a middle portion of the arm 86. As shown in FIG. 4, the stanchion 66 is off-set from the center of the trailer 10 and base 62, and the stanchion 66 is positioned closer to the first side 30 than the second side 34. The stanchion 66 is also off-set from the center of the arm 86. As shown in FIG. 4, the arm 86 includes a first length L1 extending between the first end 94 to the pivot axis 90, and a second length L2 extending between the pivot axis 90 and the second end 98.

In the illustrated construction, the arm 86 includes a counterweight 106 disposed near the first end 94. The counterweight 106 provides additional weight between the first end 94 and the pivot axis 90. With the additional weight, the center of gravity of the arm 86 is located between the first end 94 and the pivot axis 90. Therefore, when the arm 86 is unloaded and not supporting a cargo, the arm 86 will naturally pivot in a counter-clockwise direction, as shown in FIG. 4, with the first end 94 moving downwardly and the second end 98 moving upwardly.

The frame 54 includes a pivot stop 110 connected to the stanchion to restrict pivotal movement of the arm 86. As shown in FIG. 4, the pivot stop 110 includes a cross bar that extends between the two beams of the stanchion 66. The pivot stop 110 supports the arm 86 and restricts pivotal movement in the direction of the pivot stop 110. In the illustrated construction, the pivot stop 110 is positioned to support the arm 86 in a substantially level, or horizontal, position that facilitates loading the cargo onto the arm 86.

The arm 86 includes a first bracket 114 positioned near the first end 94 and a second bracket 118 positioned near the second end 98. The brackets 114, 118 receive the legs of the double-tee 150 when the double-tee 150 is positioned on the frame 54. As shown in FIGS. 4 and 5, the first bracket 114 includes a single inner support brace 122 extending upwardly from the arm 86. As shown in FIG. 5, the first bracket 114 includes the support brace 122 positioned between the respective leg of the double-tee 150 and the pivot axis 90, on the downhill side of the arm 86 from the leg. The support brace 122 of the first bracket 114 supports the respective double-tee leg when the frame 54 is in the tilted and loaded position.

The second bracket 118 includes a guide brace 126 and a support brace 130 positioned on opposite sides of the respective leg. The inner guide brace 126 is positioned between the respective double-tee leg and the pivot axis, and the outer support 130 is positioned beyond the respective double-tee leg. The support brace 130 is similar to the support brace 122 described above, and supports the respective double-tee leg when the frame 54 is in the tilted loaded position. The guide brace 126 helps direct the double-tee 150 into the desired position when the double-tee 150 is loaded onto the frame 54.

The braces 122, 126, 130 generally include a T-shaped cross-section with a contact plate having a face that contacts the double-tee leg, and a support plate that reinforces the contact plate and provides stability for the braces 122, 126, 130. The contact plates of the support braces 122, 130 are positioned at a desired angle with respect to the arm 86 to contour the surface of the double-tee leg. The contact plate of the guide brace 126 is positioned at a generally smaller angle with respect to the arm 86 to provide a slanted surface to guide the double-tee leg into the desired position against the support brace 130. The arm 86, the brackets 114, 118 and the braces 122, 126, 130 are preferably made from a strong, durable material, such as steel, iron or metal, that can withstand the loads and repetitive wear and tear experienced by contact with the cargo.

As described above, the pivot axis 90 of the arm 86 is positioned off-center from the length of the arm 86, and the arm center of gravity A is positioned near the shorter side of the arm 86. Therefore, the arm 86 will pivot in a first direction when the frame 86 is unloaded. When the double-tee 150 is positioned on the arm 86, the double-tee center of gravity (D) is positioned on the opposite side of the pivot axis 90 from the arm center of gravity (A). Due to the relatively large size of the double-tee 150, the overall combined center of gravity (C) of the arm 86 and the double-tee 150 is also positioned on the opposite side of the pivot axis 90 from the arm center of gravity (A). As shown in FIG. 5, the arm center of gravity (A) is positioned to the left of the pivot axis 90, and the double-tee center of gravity (D) and combined center of gravity (C) are both positioned to the right of the pivot axis 90. Therefore, when the double-tee 150 is positioned on the frame 54, the arm 86 will pivot in a clockwise direction, as shown in FIG. 5, with the first end 94 moving upwardly and the second end moving downwardly.

In the illustrated construction, the arm 86 includes an adjustable sleeve 134 connected to the first end 94. The first bracket 114 is connected to the sleeve 134 and extends upwardly from the sleeve 134. The sleeve 134 is movable with respect to the arm 86 to adjust the position of the first bracket 114 and accommodate double-tees having varying widths. As mentioned above, double-tees commonly have a width of about 15 feet, however, double-tees may also be formed in other sizes having widths other than 15 feet. The adjustable sleeve 134 permits the frame 54 to accommodate double-tees of varying widths.

In the illustrated construction, the sleeve 134 is movable between three pre-determined positions, a retracted position, a middle position, and an extended position. The sleeve 134 includes three openings corresponding to each position. A lock pin 138 engages the sleeve 134 and the arm 86 to maintain the sleeve 134 in the desired position. The lock pin 138 extends through the respective opening in the sleeve and also extends into the arm 86 to restrict movement of the sleeve 134 with respect to the arm 86. FIG. 5 illustrates the sleeve 134 in the retracted position, and FIG. 6 illustrates the sleeve in the middle position. Each pre-determined position (retracted, middle, and extended) may correspond to a specific width of a double-tee. For example, the middle position (FIG. 6) may be positioned to receive a double-tee having a width of 15 feet, and the retracted position (FIG. 5) may be positioned to receive a double-tee having a width of 14 feet. In an alternate construction, the first bracket 114 may be connected directly to the arm 86 and the frame 54 may only receive double-tees having legs positioned at a single uniform width from one another.

In other aspects and in other constructions (not shown), other numbers of positions may also be provided for the sleeve 134 and the arm 86. For example, the sleeve may be positionable in four or more positions with additional openings. Additionally, other means of adjusting the sleeve 134 may be used to accommodate double-tees having varying widths. For example the sleeve could include a jack-screw, a hydraulic or pneumatic mechanism, or other similar height adjustment mechanisms for extending or retracting the sleeve 134 with respect to the arm 86. The sleeve 134 may be infinitely adjustable within a desired range.

In addition, the frame 54 may accommodate double-tees having varying leg length. The frame 54 contacts the lower ends of the double-tee legs, so the length of the legs may extend above the brackets 114, 118 and still be supportable by the frame 54. The length of the legs will alter the distance between the arm 86 and the deck of the double-tee, but the frame 54 will still be able to support the double-tee.

The second end 98 of the arm 86 includes an angled clearance cut to provide a support surface 142 for the arm 86. When the arm 86 is in the tilted loaded position, as shown in FIGS. 5 and 6, the support surface 142 contacts the base 62 to provide support for the arm 86. The angled support surface 142 also permits the arm 86 to pivot further than if the arm 86 continued to a normal squared off end.

The frame 54 may include a locking mechanism to secure the frame in the tilted loaded position. The locking mechanism may include a locking pin that engages the base 62 and the second end of the arm 86 to restrict pivotal movement of the arm 86 with respect to the base 62 when the arm 86 is in the loaded position. Also, additional fasteners may be used to secure the double-tee 150 to the trailer 10, such as chains, ropes, straps, clamps, rails, or other similar fasteners. These fasteners securing devices may extend over the top of the double-tee 150 and may also be connected to fastening structures, such as hooks, eyelets, and apertures formed on the double-tee 150.

In some aspects and in some constructions (not shown), the length of the stanchion 66 may be adjustable to vary the height of the arm 86 relative to the base 62. The stanchion 66 may include a telescoping tubular configuration, in which an inner shaft is at least partially disposed within an outer shaft, and the inner shaft may be moved relative to the outer shaft to adjust the height of the stanchion 66. A locking device, such as a pin, clamp, collet, or block, may be used to secure the inner shaft with respect to the outer shaft. Since the stanchion 66 provides the pivot point of the arm 86, adjusting the height of the stanchion 66 will adjust the angle the arm 86 and double-tee 150 are positioned relative to the trailer frame 14. Also, adjusting the height may further reduce the effective width of the double-tee 150.

In the illustrated construction, the frames 54, 54' are removably connected to the trailer frame 14. The bolster frames 54, 54' may be positioned at a desired location with respect to the trailer frame 14 depending on the size of the load to be carried. It is generally desirable to position the center of gravity of the load near the midpoint, or center of the width, of the trailer 10, or about half-way between the wheels 18. Various fastening means, such as bolts, pins, latches, or clamps may be used to connect the bolster frames 54, 54' to the trailer frame 14. In some aspects and in some constructions, the bolsters may be permanently connected to the trailer frame 14 through welding, or other similar permanent fastening means, to create a dedicated trailer 10 for transporting oversized cargo. In some aspects and in some constructions, the trailer 10 may include a trailer frame, and the bolster frames 54, 54' may be connected directly to the trailer frame.

In operation, the frame 54 is positioned in the unloaded position, as shown in FIG. 4. The arm center of gravity A naturally pivots the arm 86 to the unloaded position to contact the pivot stop 110 and position the arm 86 in the generally horizontal position. The double-tee 150 is positioned onto the frame 54 when the frame 54 is in the unloaded position.

Loading and unloading a double-tee 150 on the support structure is not always a precise procedure. The double-tee 150 is a relatively large object, sometimes measuring about 15 feet wide by about 60 feet long and weighing about 66,000 pounds, and is often lowered onto the frame 54 with a crane. Some double-tees may weigh as much as about 100,000 pounds. When supported by the crane, the double-tee 150 may move due to various factors, such as wind or change in momentum, thereby shifting the load in the air. While being lowered, the double-tee 150 is generally first positioned with the deck generally parallel to the ground, or trailer frame, while being lowered onto the frame 54.

The brackets 114, 118 receive the respective legs of the double-tee 150 as it is lowered onto the frame 54, and the guide brace 126 helps guide the double-tee 150 into the desired position with the legs disposed adjacent the respective support braces 122, 130. When the double-tee 150 is completely lowered onto the frame 54, and the frame 54 is supporting the double-tee 150, the combined center of gravity (C) of the arm 86 and the double-tee 150 causes the arm 86 and double-tee 150 to pivot to the loaded position, as shown in FIGS. 5 and 6. The support surface 142 of the arm 86 contacts the base 62 and the double-tee 150 is then positioned in the tilted loaded position.

Positioning the double-tee 150 on the frame 54 in the tilted loaded position (FIGS. 5 and 6) reduces the effective width of the double-tee 150 with respect to the road or surface on which the trailer 10 is traveling. The double-tee 150 includes a width (W) extending between the sides of the double-tee 150. The effective width (EW) is the space the double-tee 150 takes up above the road and is generally measured in a plane substantially parallel to the road or surface. For example, the double-tee 150 shown in FIG. 6 has a deck with an overall width (W) of about 15 feet, which represents the distance between the two sides of the double-tee 150. When positioned on the bolster frames 54, the effective width (EW) of the double-tee 150 is about 13 feet.

FIG. 6 illustrates a center of gravity (D) of the double-tee 150 positioned below the deck and between the legs of the double-tee 150. In the illustrated construction, the frame 54 positions the center of gravity (D) of the double-tee 150 substantially over the midpoint of the trailer 10. While it is not necessary to have the center of gravity (D) perfectly aligned with the midpoint, positioning the center of gravity (D) of the double-tee 150 near the midpoint of the trailer 10 does help stabilize the load for transport on the trailer 10.

In the illustrated construction, the frame 54 supports the double-tee 150 in the tilted loaded position with the raised side of the double-tee 150 positioned near the first side 30, or left side, of the trailer 10, and the lowered side of the double-tee 150 positioned near the second side 34, or right side, of the trailer 10. The illustrated construction is intended for use in regions in which vehicles travel on the right side of the road and the left side of the vehicle is the inner side on the roadway. In this construction, the raised side of the double-tee 150 is on the inner side of the trailer 10 and the lowered side of the double-tee 150 is on the outer side of the trailer 10. Therefore, the raised side of the double-tee 150 is viewable by oncoming traffic on the opposite side of the road and provides additional clearance for the oncoming traffic. The raised side is generally less intimidating for an oncoming driver than the lowered side.

In some aspects and in some constructions, the frame 54 may be reversed with respect to the trailer frame 14 with the raised end of the double-tee 150 positioned near the second side 34, or right side, and the lowered side of the double-tee 150 positioned near the first side 30, or left side, of the trailer 10. This construction may be desirable in regions where vehicles travel on the left side of the road.

In the illustrated construction, the support structure and frame 54 are mounted on the trailer 10 for transportation and use with a semi tractor. In other aspects and in other constructions, the support structure and frame 54 could also be mounted on other means of transportation, such as train cars, boats, barges, sleds, or other similar devices. The frame 54 could also be used to for stationary storage of a double-tee or other oversized objects. It should be understood that while the figures illustrate the structure supporting a double-tee, the support structure and frame 54 may also support other oversized cargo.

The foregoing detailed description describes only a few of the many forms that the present invention can take, and should therefore be taken as illustrative rather than limiting. It is only the claims, including all equivalents that are intended to define the scope of the invention.

We claim:

1. A method for loading a concrete double-tee having a deck, a first leg and a second leg onto a support structure having a base, a stanchion extending upwardly from the base, an arm pivotally connected to the stanchion and extending between a first and second end, the arm having a first bracket disposed near the first end and a second bracket disposed near the second end, the method comprising the acts of:

positioning the arm in a first position in which the arm is substantially horizontal, the arm being pivotally biased toward the first position;

lowering the double-tee onto the arm such that the first leg of the double-tee is received by the first bracket and the second leg of the double-tee is received by the second bracket; and pivoting the arm and double-tee to a second position in which the second end of the arm contacts the base to support the arm, the arm being biased toward the second position when the arm supports the double-tee.

2. The method of claim 1, further comprising the act of securing the second end of the arm to the base to restrict pivotal movement of the arm with respect to the base.

3. The method of claim 1, further comprising the act of establishing a center of gravity for the arm at a position different than a center of gravity of the concrete double-tee.

4. The method of claim 3 wherein the center of gravity of the arm is positioned between the first end of the arm and the stanchion.

5. The method of claim 3 wherein the center of gravity of the concrete double-tee is positioned between the stanchion and the second end of the arm.

6. A method of loading cargo, the method comprising:
positioning the cargo on an arm adapted to pivot about an axis, the arm having a center of gravity causing the arm to move in a first direction, the arm supported by a base and a stanchion positioned between the base and the arm;
moving the arm in a second direction opposite the first direction until the arm contacts the base due to a center of gravity of the cargo different than the center of gravity of the arm; and
adjusting a height of the arm to reduce an effective width of the cargo when the arm is in contact with the base.

7. The method of claim 6 wherein the arm includes a first end and a second end, and wherein the center of gravity of the arm is positioned between the first end of the arm and the axis.

8. The method of claim 7 wherein the center of gravity of the cargo is positioned between the second end of the arm and the axis.

9. The method of claim 6 wherein the cargo includes a first leg and a second leg, and wherein positioning the cargo on the arm includes positioning the first leg in a first bracket and the second leg in a second bracket, the first bracket and the second bracket supported by the arm.

10. The method of claim 6 wherein moving the arm occurs automatically due to the center of gravity of the cargo.

11. The method of claim 6 wherein the arm includes a first end and a second end, and wherein moving the arm includes moving the first end in an upward direction and moving the second end in a downward direction.

12. The method of claim 6 wherein the arm includes a sleeve adapted to slide along the arm, the sleeve supporting a bracket, and further comprising adjusting the sleeve to accommodate the cargo.

13. The method of claim 12 wherein the cargo includes a first leg and a second leg, and wherein adjusting the sleeve to accommodate the cargo includes adjusting the position of the bracket to receive one of the first leg and the second leg.

14. The method of claim 6 wherein the arm includes a first end and a second end, and further comprising securing the second end of the arm to the base.

15. The method of claim 6 further comprising reducing an effective width of the cargo when the arm is in contact with the base.

16. A method of loading cargo, the method comprising:
positioning the cargo on a frame of a trailer, the frame supporting an arm;
automatically moving the arm from a first position to a second position; and
reducing an effective width of the cargo when the arm is in the second position.

17. The method of claim 16 wherein the arm is adapted to pivot about an axis, the arm having a center of gravity causing the arm to move in a first direction, the cargo having a center of gravity causing the arm to move in a second direction when the cargo is positioned on the arm.

18. The method of claim 16 wherein automatically moving the arm includes adjusting a center of gravity of the arm from a first location to a second location.

19. The method of claim 18 wherein the arm includes a first end and a second end, the arm adapted to pivot about an axis, the first location of the center of gravity of the arm positioned between the first end of the arm and the axis, the second location of the center of gravity of the arm positioned between the second end of the arm and the axis.

* * * * *